United States Patent [19]
Greger

[11] 3,795,827
[45] Mar. 5, 1974

[54] CONTROLLED SQUAREWAVE VOLTAGE GENERATING ELECTRONIC CIRCUIT

[75] Inventor: William J. Greger, Cupertino, Calif.

[73] Assignee: Nortec Electronics Corporation, Santa Clara, Calif.

[22] Filed: Aug. 31, 1972

[21] Appl. No.: 285,222

[52] U.S. Cl. .................. 307/279, 307/304, 307/205
[51] Int. Cl. .................. H03k 3/26
[58] Field of Search 307/221 C, 220, 251, 279, 304, 307/205

[56] References Cited

UNITED STATES PATENTS

| | | | |
|---|---|---|---|
| 3,588,848 | 6/1971 | Van Beek | 307/279 |
| 3,631,528 | 12/1971 | Green | 307/279 |
| 3,641,366 | 2/1972 | Fujinoto | 307/304 |
| 3,660,684 | 5/1972 | Padgett | 307/279 |
| 3,737,673 | 6/1973 | Suzuki | 307/205 |
| 3,746,913 | 7/1973 | Gianopulos | 307/221 C |

*Primary Examiner*—John S. Heyman
*Assistant Examiner*—Ro E. Hart
*Attorney, Agent, or Firm*—Limbach, Limbach & Sutton

[57] ABSTRACT

A circuit having a single output includes two sections which each connect to said output a squarewave of different voltage levels but the same period as controlled by a common clock signal. A common data input signal selects which of the circuit sections is to operate and connect its squarewave with said output. One of the sections includes a source follower MOS field effect transistor current amplifier and two reference voltage supply circuits having a resistive voltage divider and an MOS device in series therewith to compensate for variations in the current amplifier threshold voltage drop.

4 Claims, 5 Drawing Figures

CONTROLLED SQUAREWAVE VOLTAGE GENERATING ELECTRONIC CIRCUIT

BACKGROUND OF THE INVENTION

This invention relates generally to electronic circuits for generating squarewaves of precise voltage levels. To be able to generate precise voltage level squarewaves is a primary object of the present invention. It is a further object of the present invention to be able to select at a single output between two different voltage level squarewave signals by keying the circuit with a single data input signal. It is another object of the present invention to provide a reference voltage circuit that operates to provide voltages within very close tolerances. It is yet another object of the present invention to provide such a squarewave generating circuit that is conveniently executed in integrated circuit form using MOS field effect transistors.

SUMMARY OF THE INVENTION

Briefly, these and additional objects of the present invention are realized by an electronic circuit having two independent sections that are connected to a single output. Each section of the circuit has its own output that varies between two voltage levels in response to a common clock signal, the voltage levels of the signal from one section being different than the voltage levels from the other section. In a specific form of the circuit described hereinafter, both extreme voltage levels of the squarewave output of one section are intermediate in value of the output levels of the squarewave of the other section. Each section of the circuit contains disabling circuits connected to a single data input in a manner that one level of a data input signal enables one section while disabling the other, and another level of the data input signal enables said another section while disabling said one. Therefore, the desired squarewave signal is formed at the output of the circuit by applying to the circuit the appropriate level data input signal.

The circuit is most conveniently formed of MOS field effect transistors on a single integrated circuit chip. In one form of the circuit, a source follower MOS current amplifier is utilized which thus introduces the threshold voltage of the MOS device as a parameter that can vary under different environmental conditions, by aging and between different process runs during manufacture the integrated circuit chips. Since an accurate voltage squarewave signal is desired at the output of such a source follower current amplifier, a compensating circuit is provided in the voltage supply to the current amplifier. This compensating circuit is part of a voltage divider and includes an MOS field effect transistor device connected between two resistors in series, the series circuit being connected across a voltage supply. The MOS device of the series circuit has its gate connected to its drain and this common point constitutes the output of the voltage circuit. Therefore, as the threshold voltage of the MOS device of the current amplifier changes, similar changes will occur in the threshold voltage of the MOS device in the series voltage dividing circuit, thereby to provide compensation.

Additional objects and advantages of the various aspects of the present invention are included in the following detailed description of its preferred embodiments which should be taken in conjunction with the accompanying drawings.

DESCRIPTION OF THE PREFERRED EMBODIMENTS

Figures 1A, 1B:
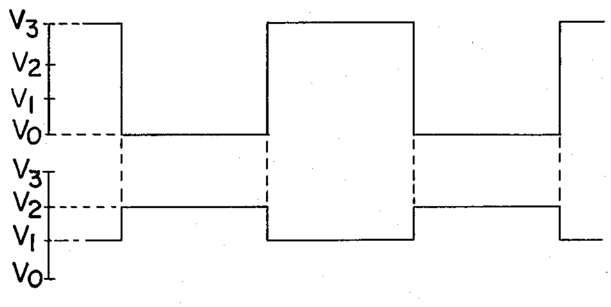
FIGS. 1*a* and 1*b* shows the two squarewave outputs desired at a single output terminal.

Referring to FIG. 1*a*, a squarewave is displayed having extremely voltage values extending from $V_O$ to $V_3$. Fig. 1*b* shows a squarewave of a similar period but 180° out of phase with that of FIG. 1*a*. Additionally, the amplitude of the squarewave of FIG. 1*b* is between voltage levels $V_1$ and $V_2$. Both of the voltage levels $V_1$ and $V_2$ are intermediate of the maximum levels $V_O$ and $V_3$ of the squarewave form of FIG. 1a. It is these waveforms that the various aspects of the present invention are designed to produce with very close voltage tolerances and repeatability from circuit to circuit. The voltage spread between $V_O$ and $V_3$ may be, for instance, something in the order of eight volts while the voltage levels $V_1$ and $V_2$ are equally positioned in voltage level therebetween.

Figures 2, 3, 4:
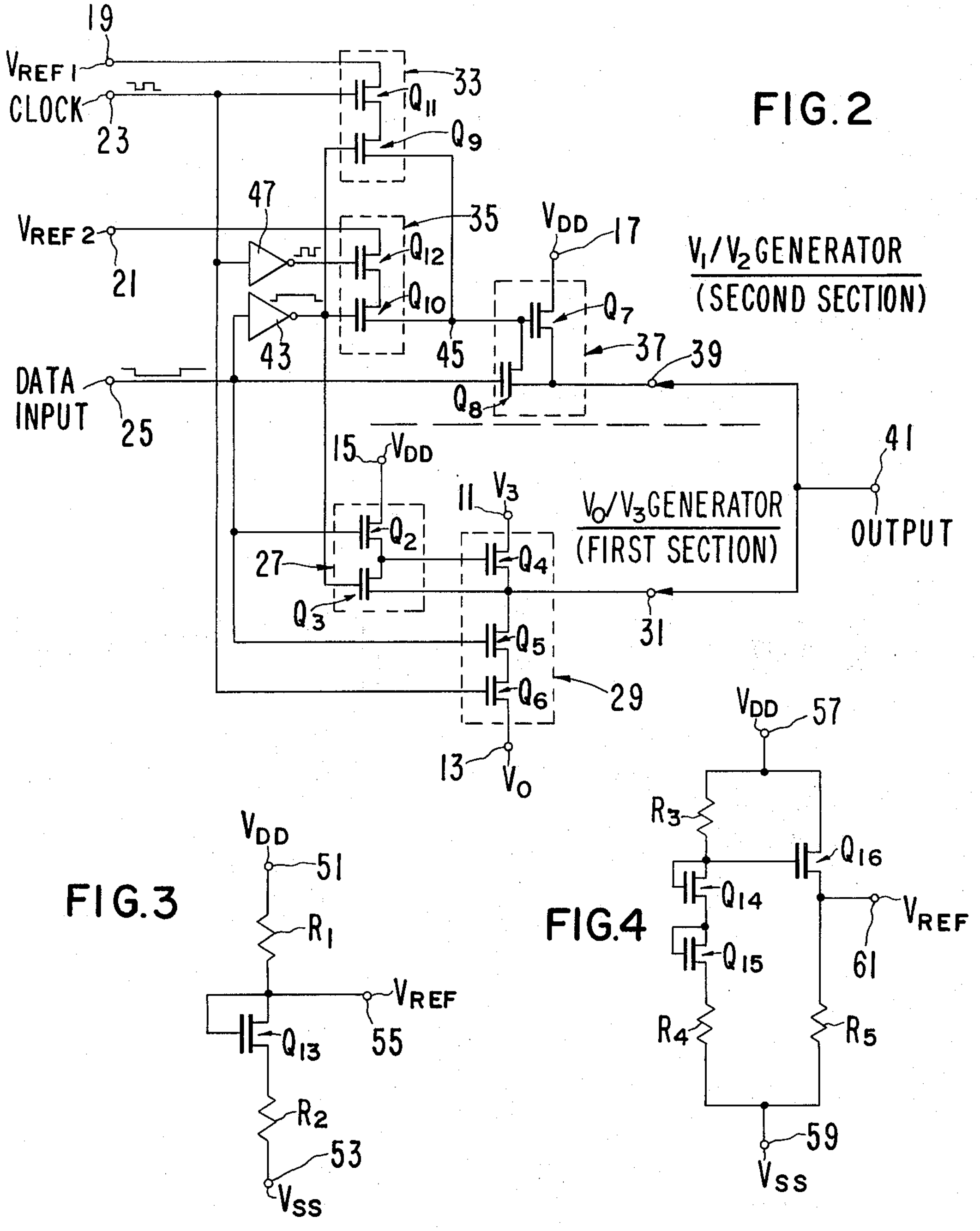
FIG. 2 is a schematic diagram of a circuit which generates the voltage waveforms of FIG. 1.
FIGS. 3 and 4 are alternate reference voltage supply circuits for use in conjunction with the circuit of FIG. 1.

The schematic diagrams of FIGS. 2, 3 and 4 show preferred embodiments of the various aspects of the present invention for deriving the voltage waveforms of FIG. 1. Each of the transistors Q1 through Q16 are MOS field effect transistors of the p-channel type that are in a normally off condition absent sufficient voltage applied to their gates. The voltage $V_O$ is made to be zero volts in the discussion to follow and the supply voltage $V_{DD}$ is −15 volts. $V_3$ is chosen to be −8 volts while $V_1$ is one-third of −8 volts and $V_2$ is two-thirds of −8 volts. All of the MOS transistors are constructed on a single small integrated circuit. Therefore, all of the transistors have a common substrate and this substrate is connected with the highest voltage in the circuit, this voltage being $V_O = 0$ in the specific example described with respect to the drawings. It will be understood, of course, that the transistors can alternatively be chosen to be n-channel types. The polarity of the various voltages in the circuit and the resulting voltage outputs would then be reversed. A voltage $V_{DD}$ of +15 volts could then be used with a voltage $V_o$ of zero volts and the squarewave output maximum voltage $V_3$ would be +8 volts. With n-channel MOS transistors, the substrate would be connected to the positive 15 volt $V_{DD}$ supply as the most positive potential in the circuit.

Referring to FIG. 2, the maximum voltage $V_3$ desired in the squarewave output is applied to a terminal 11, this voltage being −8 volts in the specific embodiment described. The voltage $V_O$ of the squarewave output is applied to a terminal 13, this voltage being zero volts or ground potential in the specific circuit example. A drain supply voltage $V_{DD}$ of −15 volts is applied to terminals 15 and 17. The intermediate voltages $V_1$ and $V_2$ of the squarewave output are derived, respectively, from voltages $V_{REF1}$ applied to a terminal 19 and $V_{REF2}$ applied to a terminal 21. The voltages $V_{REF1}$ and $V_{REF2}$ are slightly higher than the desired voltages $V_1$ and $V_2$, respectively, because of a transistor threshold voltage drop in the circuit of FIG. 2, to be described hereinafter. A squarewave clock signal is applied to a terminal 23 from some convenient source. The clock signal is sufficient in magnitude to turn on selected MOS transistor devices, generally varying between a low voltage of zero volts and a high voltage of −15 volts. The period of the clock signal applied to the terminal 23 is the same as that desired in the output squarewave signals shown in FIG. 1. A data input signal is applied to a terminal 25. The data input signal has two states, varying between a low state of zero volts and a high state of −15 volts sufficient to switch selected MOS transistor devices in the circuit of FIG. 2.

The circuit of FIG. 2 can be considered as comprising two separate sections. The first section includes a circuit 27 which is functionally equivalent to a two input AND gate and a circuit 29 which functions as a two input NAND gate. An output terminal 31 of the first section carries the maximum magnitude squarewave of FIG. 1a having a period corresponding to that of the clock signal applied to the terminal 23 when the data input signal at the terminal 25 is at its high (−15 volts) level.

The second section of the circuit of FIG. 2 includes circuits 33 and 35 which each is functionally equivalent to that of a three input AND gate. A circuit 37 is functionally equivalent to a two input AND gate. An output terminal 39 of the second section of the circuit of FIG. 2 carries the lower magnitude squarewave of FIG. 1*b* having maximum swing between the intermediate voltage levels $V_1$ and $V_2$ in synchronism with a clock signal applied to a terminal 23 when the data input signal at the terminal 25 is in its low (0 volts) level. A composite circuit output terminal 41 is provided with lines connecting it to the output terminals 31 and 39 of the two sections of the circuit. Only one of the sections operates at any one time to develop a squarewave output at the terminal 41, however, by inhibiting and disabling circuits to be described hereinafter which are provided to operate in response to the data input signal at the terminal 25. When the data input signal is proper to turn on one of the two sections of the circuit, it simultaneously acts to inhibit and isolate the other of the two sections of the circuit from the output terminal 41.

Referring to the first section of the circuit of FIG. 2 in more detail, a transistor Q2 has its gate connected to the data input terminal 35 while its drain is connected with the voltage supply terminal 15 and its source is connected with the gate of a transistor Q4. The drain of the transistor Q4 is connected with the voltage supply terminal 11 while the source of transistor Q4 is connected with the output terminal 31. A transistor Q3 has its drain connected to the source of the transistor Q2 and thus to the gate of the transistor Q4, while the gate of Q3 is connected to an output of an inverting circuit 43. The inverting circuit 43 has its input connected to the data input terminal 25. Thus the output of the inverter 43 is a signal that is opposite to that applied to the data input terminal 25. The transistor Q2 biases the gate of the transistor Q4 while the transistor Q3 acts as a "kill device" to disable the transistor Q4 by shorting its gate to its source when the transistor Q3 is turned on to its low resistance state.

A transistor Q5 has its drain connected with the output terminal 31 while its source is connected with the drain of a transistor Q6. A source of the transistor Q6 is connected to the voltage supply terminal 13 ($V_O$) which is held, in this example, at zero or ground potential. A gate of the transistor Q5 is connected to the data input terminal 25 and a gate of the transistor Q6 is connected with the clock terminal 23.

This first section of circuit of FIG. 2 operates when the signal of the data input terminal 25 is at its high (−15 volts) level to produce at the output terminal 31 the the waveform of FIG. 1*a*. In this state, the data input signal turns the transistor Q5 on into its low resistance state. The transistor Q2 is also in its on condition, while the transistor Q3 is off since its gate receives a signal corresponding to a low data input signal which is insufficient to turn it on. The clock signal at the terminal 23 alternately turns the transistor Q6 on and off by high (−15 volts) and low (0 volts) signals, respectively. When the transistor Q6 is on, the output terminal 31 is clamped to the voltage terminal 13 and thus assumes a value $V_O$. When the transistor Q6 is in its off condition during the opposite cycle of the clock signal at the terminal 23, the transistor Q4 is on and clamps the terminal 31 to the voltage terminal 11 at a voltage value of $V_3$.

The first section of the circuit of FIG. 2 is disabled when the data input at the terminal 25 is in its low (0 volts) state. In this condition, transistors Q2 and Q5 are in their off states and transistor Q3 is turned on. Transistor Q6 changes between its on and off state under the influence of the clock signal at the terminal 23 but this is of no effect since the transistor Q5 in series therewith remains off under the low data input signal condition. The transistor Q4 is also off since its gate bias transistor Q2 has been turned off. To assure that there is no connection of the output terminal 31 to the voltage supply terminal 11 by leakage current through the transistor Q4, the transistor Q3, in its on state, shorts the gate of the transistor Q4 to its source. When the data input signal at the terminal 25, then, is at its low level (0 volts), the output terminal 31 is floating and is not connected to either of the voltage supply terminals 11 or 13.

The second section of the circuit of FIG. 2 operates to produce the waveform of FIG. 1*b* at the terminal 39 of FIG. 2 when the data input signal at the terminal 25 is in it low (0 volts) state. Under this condition, the reference voltage $V_{REF1}$ at the terminal 19 is turned on and off by the clock signal at the terminal 23 by means of a transistor Q11. The drain of the transistor Q11 is connected with the terminal 19 while its gate is connected with the clock terminal 23. The source of the transistor Q11 is connected with the drain of a transistor Q9 whose source is connected to a junction 45 which serves as a wiredOR gate. The gate of the transistor Q9 is connected to the output of the inverter 43 so is turned on by a low data input signal at the terminal 25. Therefore, when the data input signal at the terminal 25 is low (0 volts), the voltage $V_{REF1}$ is connected from the terminal 19 to the wire junction 45 when the clock signal at the terminal 23 is in its high level (−15 volts) and disconnected therefrom when the clock signal 23 is in the low portion of its repetitive cycle.

The reference voltage $V_{REF2}$ is applied from the terminal 21 through transistors Q12 and Q10 to the wire junction 45. The terminal 21 is connected to a drain of the transistor Q12 while its source is connected to the drain of the transistor Q10. The source of the transistor Q10 is connected with the wire junction 45. An inverter 47 receives at its input the clock signal from the terminal 23 and generates at its output a signal 180° out of phase with the clock signal. This output of the inverter 47 is connected to the gate of the transistor Q12 and thus Q12 is turned on when the clock signal is in its low (0 volt) state. The transistor Q10 has its gate connected with the output of the inverter 43 in the same manner as Q9 is connected so that it remains conductive so long as the data input signal is in its low state. The transistors Q11 and Q12, function, therefore, to apply in alternating time sequence first the voltage $V_{REF1}$ and then the voltage $V_{REF2}$ to the wire junction 45, so long as the data input signal at the terminal 25 remains low.

This alternting voltage level at the wire junction 45 is applied to a gate of a transistor Q7 those drain is connected with the voltage terminal 17 and its source is connected to the output terminal 39. The transistor Q7 functions as a source follower current amplifier which transmits the squarewave voltage at the wire junction 45 to the output terminal 39 with an increased current availability that is satisfactory for driving higher current loads that can be driven from the wire junction 45 directly. There is, of course, a threshold voltage drop between the gate and source of the transistor Q7. Since the voltages $V_1$ and $V_2$ desired to be presented at the output terminal 39 are to be as accurate as possible, the voltages $V_{REF1}$ and $V_{REF2\ 2}$ are made higher than the desired voltages $V_1$ and $V_2$, respectively, by an amount equal to the threshold voltage of the transistor Q7.

When the data input signal at the terminal 25 is in its high state and causes operation of the first section of the circuit of FIG. 2, the second section of that circuit is disabled. The reference voltages $V_{REF1}$ and $V_{REF2}$ are isolated by the transistors Q9 and Q10 turning off when the data input signal goes to its high (−15 volts) level. To assure that there is no leakage current to the transistor Q7 to the output terminal 39, a "kill device" transistor Q8 is provided with its drain connected to the gate of transistor Q7 while the source of the transistor Q8 is connected with the source of the transistor Q7. The gate of the transistor Q8 is connected to the data input terminal 25 so that Q8 is turned on when the data input signal is in its high state. When the second section of the circuit of FIG. 2 is in its operative mode by the data input signal at the terminal 25 being in its low state, the transistor Q8 is turned off and does not affect the circuit.

Therefore, a specific embodiment of certain aspects of the present invention has been described with respect to FIG. 2. The clock signal applied to the terminal 23 keeps repeating itself, while the data input signal applied to the terminal 25 is selectively changed between its high (−15 volts) and low (0 volts) states from some additional circuits not shown. When the data input is in its high state (−15 volts) the first section of the circuit operates to present the waveform of FIG. 1*a* at the output terminal 41 while the second section of the circuit is disabled and isolated from the output terminal 41. On the other hand, when the data input signal is in its low state (0 volts) the second section of the circuit operates to present the waveform of FIG. 1b at the output terminal 41 while the first section of the circuit is disabled and isolated from the output terminal 41.

The voltages $V_1$ and $V_2$ are desired to be precisely controlled. Therefore, care must be taken in designing the circuits that supply the reference voltages $V_{REF1}$ and $V_{REF2}$ to the terminals 19 and 21 of FIG. 2. One reference voltage supply circuit that compensates for changes in environmental conditions of the circuit of FIG. 2 to keep the voltages $V_1$ and $V_2$ constant is shown in FIG. 3. A voltage divider circuit including resistors $R_1$ and $R_2$ is connected between a potential difference existing between terminals 51 and 53. A transistor Q13 is connected between the resistors $R_1$ and $R_2$ with its gate and drain both connected to the side of the resistor $R_1$ opposite to the side connected with the voltage terminal 55. The source of the transistor Q13 is connected to a side of the resistor $R_2$ opposite to that side connected to the voltage terminal 53. An output terminal 55 of the circuit of FIG. 3 is connected to the common drain and gate connection of the transistor Q13. This output is connected to one of the terminals 19 and 21 of FIG. 2 while a similar circuit to that of FIG. 3 is connected to the other of the terminals 19 and 21. Of course, since the voltages $V_{REF1}$ and $V_{REF2}$ are desirably different, the resistors $R_1$ and $R_2$ will have different relative values for a circuit designed to supply $V_{REF1}$ than for a circuit designed to supply $V_{REF2}$. The advantage to the supply circuit of FIG. 3 is that the transistor Q13 has a threshold voltage drop thereacross which will vary in response to environmental and other changing conditions to compensate for a varying threshold voltage drop of the current amplifier transistor Q7 of FIG. 2. The threshold voltage of the transistor Q7 can vary due to changing environmental conditions such as temperature and humidity, or may vary between integrated circuit chips containing the same circuits that are formed during different process runs.

In some applications, it may be desirable to have a plurality of circuits shown in FIG. 2 operate from a single pair of reference voltage circuits. In this case, the voltage supply circuit of FIG. 3 may not be satisfactory to supply a higher transient current required. Therefore, the circuit of FIG. 4 may be used, one each for developing the reference voltages $V_{REF1}$ and $V_{REF2}$. The circuit of FIG. 4 includes a resistor R3 connected to a voltage supply terminal 57 at one side thereof with its other side connected to a common gate and drain connection of a transistor Q14. A source of the transistor Q14 is connected with a common gate and drain connection of a transistor Q15. A source connection of the transistor Q15 is connected to one side of resistor R4 with the other side of the resistor R4 connected to a voltage supply terminal 59.

A transistor Q16 of FIG. 4 has its drain connected to the supply terminal 57 and its source connected through an optional resistor R5 to the voltage supply terminal 59. The gate of the transistor Q16 is connected with the common gate and drain connection of the transistor Q14. The reference voltage of the circuit of FIG. 4 is developed at the source of the transistor Q16 which is connected to an output terminal 61. The transistor Q16 is a current amplifier connected in a source follower mode and presents a second threshold voltage drop that can vary due to changing conditions. Therefore, two transistors Q14 and Q15 are employed in series in the voltage divider circuit of FIG. 4 to compensate for changing threshold voltages of transistor Q7 (FIG. 2) and transistor Q16 (FIG. 4).

A voltage divider including two series resistors as shown in both FIGS. 3 and 4 is preferred since the values of these resistors may vary somewhat due to changing environmental conditions without significantly affecting the voltage output. Any such changing conditions affect both resistors in equal amounts. A variation in the threshold voltages of each of the transistors Q13, Q14 and Q15 as a function of their drain-to-source current can be substantially eliminated by minimizing this current. Therefore, the values of R1 and R2 of FIG. 3 and R3 and R4 of FIG. 4 are each preferably of a high value, such as 1–5 megohms for the articular application described. These high resistances values and a desirability to maintain them somewhat uniform from circuit to circuit makes it preferable to employ resistors external to an integrated circuit chip.

The various aspects of the present invention have been described with respect to specific examples thereof, but it will be understood that the invention is entitled to protection within the full scope of the appended claims.

I claim:

1. An electronic circuit for generating a first squarewave voltage waveform with extreme voltage levels of $V_O$ and $V_3$ at an output terminal in response to a first data input signal, and for generating a second squarewave voltage waveform at said output terminal with extreme voltage levels of $V_1$ and $V_2$ in response to a second data input signal, said voltage levels $V_1$ and $V_2$ both lying intermediate in magnitude between the voltage levels $V_O$ and $V_3$, said circuit comprising:

logic gating means responsive to said first data input signal for connecting said output terminal alternately between voltage supply levels $V_O$ $V_3$ in response to a clock signal, said logic gating means additionally including means responsive to said second data input signal for isolating said output from each of said $V_O$ and $V_3$ voltage level supplies, and means responsive to said second data input signal for applying said second squarewave to said output terminal, said second waveform means including semi-conductor switching circuits connected to connect said output terminal alternately between V1 and V2 voltage reference supplies in response to said clock signal and further including means for disconnecting said V1 and V2 reference voltage supplies from said output terminal in response to said first data signal.

2. An electronic circuit for generating a first squarewave voltage waveform with extreme voltage levels of $V_O$ and $V_3$ at an output in response to a first state of a data input signal, and for generating a second squarewave voltage waveform at said output with extreme voltage levels of $V_1$ and $V_2$ in response to a second state of said data input signal, said voltage levels $V_1$ and $V_2$ both lying intermediate in magnitude between the voltage levels $V_O$ and $V_3$, said circuit comprising:

logic gating means responsive to said first data input signal state for connecting said output alternately between voltage supply levels $V_O$ and $V_3$ in response to a clock signal, said logic gating means additionally including means responsive to said second data input signal state for isolating said output from each of said $V_O$ and $V_3$ voltage level supplies, first and second voltage reference circuits, each of said voltage reference circuit including a voltage divider of two resistors connected in series across a voltage supply with an MOS field effect transistor also connected in series between said resistors, said MOS transistor having a gate and a drain connected commonly to one of said resistors at a point constituting its reference voltage output and a source connected to the other of said resistors, whereby said resistors are chosen in value to give the desired reference voltage level at the reference voltage output, means enabled by said second data input signal state for alternately switching between the outputs of said first and second reference voltage supply circuits in response to said clock signal, said alternate switching means being disabled by said first data input signal state, and a current amplifier receiving the output of said alternately switching means and connecting it to said circuit output for generation of said second squarewave voltage signal, said current amplifier including an MOS field effect transistor connected in a source follower circuit with a source connected to said output and a gate connected to said alternately switching means.

3. The electronic circuit according to claim 2 wherein said current amplifier additionally includes means connected between the gate and source of said MOS field effect transistor device for effecting a short circuit therebetween in response to said first data input signal, thereby to assure that when said first squarewave is being generated at the circuit output terminal that the circuits generating the second square-wave are isolated therefrom.

4. The electronic circuit according to claim 2 wherein each of said first and second reference voltage supply circuits includes another MOS field effect transistor device connected as a souce follower current amplifier with its gate connected to said reference voltage output, each of said first and second reference voltage circuits additionally including a second MOS field effect transistor in said series voltage dividing circuit.

* * * * *